Patented Sept. 18, 1945

2,385,314

UNITED STATES PATENT OFFICE 2,385,314

FURYL SULPHONATES

Jack T. Thurston, Riverside, Conn., assignor to American Cyanamid Company, New York, N. Y., a corporation of Maine No Drawing. Application August 1, 1942,
Serial No. 453,277

3 Claims. (Cl. 260—345)

This invention relates to certain new and useful compounds and to their preparation. More particularly, my invention relates to furyl substituted organic sulphonates.

An object of this invention is to provide sulphonates which contain a furyl group as a substituent.

Another object of this invention is to provide organic sulphonates suitable for the preparation of resins having cation active properties.

A further object of my invention is to provide processes for preparing the aforementioned sulphonates.

The compounds which form the subject of this invention have the following general formula:

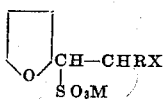

where X is an activating group possessing a polar bond, e. g.,

aliphatic, —COOR, —CONRR, —CN, —NO$_2$; and where M is a metal or hydrogen or —H·NR$_2$R$_3$R$_4$ where R, R$_2$, R$_3$ and R$_4$ are hydrogen or organic radicals. The term "sulphonate" as used herein is intended to cover the hydrogen sulphonate as well as the metal, ammonia or amine salts thereof.

The sulphonates described above may be prepared by treating a compound of the following formula:

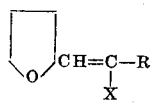

where X and R are the same as before, with a bisulphite or with sulphur dioxide in a suitable medium such as water or mixtures of organic solvents and water. Compounds of the formula

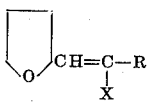

may be prepared by condensing 1 mol of furfural with 1 mol of a substance containing an active methyl group or an active methylene group, e. g., compounds having the formula:

(where R and X are defined in the same manner as above) or vinylogs thereof.

The following examples in which the proportions are in parts by weight, except as otherwise indicated, are given by way of illustration and not in limitation and the furfural is 95% pure.

EXAMPLE 1

*Preparation of sodium 1-alpha-furyl-1-(3-keto-3-phenylpropane) sulphonate*

|  | Parts |
| --- | --- |
| Furfurylidene acetophenone | 594 |
| 95% sodium bisulphite | 360 |
| Water | 1,000 |

A mixture of these substances is heated in a reaction vessel provided with an agitator and heated by a suitable means, such as, for example, a steam jacket. The temperature is brought to about 105° C. and after about 40 minutes a clear solution is obtained. The temperature is maintained at around 105° C. for an additional 30 minutes and then permitted to cool. The white crystals which deposit on cooling are filtered and washed with water, alcohol and acetone. The product thus obtained is a dihydrate of the sulphonate. It is dried at about 110° C. to produce a yield of 91% of the anhydrous sulphonate which has a melting point of about 231° C.

EXAMPLE 2

*Preparation of furfurylidene methyl ethyl ketone*

|  | Parts |
| --- | --- |
| Methyl ethyl ketone (1 mol) | 72 |
| Furfural (1 mol) | 101 |
| Sodium hydroxide | 4 |
| Water | 400 |

The mixture of the methyl ethyl ketone and the water containing the sodium hydroxide dissolved therein is placed in a reaction vessel provided with a mechanical agitator. Sufficient ethanol is added to give a clear solution. The furfural is added very slowly over a period of about 20 minutes during which time an oily material begins to separate. After agitating for an additional hour the reaction mixture is acidified by the addition of 10% sulphuric acid, thereby causing the complete separation of the oily material. This material is decanted and distilled under reduced pressure yielding about 69% of the theoretical quantity of product boiling at about 98° C. at 1 mm. of mercury absolute pressure. The product analyzes as follows:

|  | Percent C | Percent H |
|---|---|---|
| Calcd. for $C_9H_{10}O_2$ | 72.00 | 6.67 |
| Obtained | 71.98 | 6.68 |
|  | 71.96 | 6.80 |

Preparation of potassium-1-alpha-furyl-3-ketopentane sulphonate

| | Parts |
|---|---|
| Furfurylidene methyl ethyl ketone (3.28 mols) | 429 |
| Potassium metabisulphite (1.64 mols) | 364 |
| Water | 500 |

A mixture of these substances is refluxed for about 2–3 hours in a suitable apparatus. The resulting mixture is filtered and the product is separated from the filtrate by the addition of sufficient ethanol. The solid product is filtered, washed with alcohol and dried. A 51% yield of a product which does not melt at temperatures up to 250° C. is obtained.

EXAMPLE 3

Preparation of furfurylidene methyl isobutyl ketone

| | Parts |
|---|---|
| Methyl isobutyl ketone (5 mols) | 500 |
| Furfural (5 mols) | 505 |
| Sodium hydroxide (0.5 mol) | 20 |
| Water | 2,000 |
| Ethanol | 1,160 |

The sodium hydroxide is dissolved in water and the ketone is mixed with the resulting solution in a reaction vessel provided with an agitator. The alcohol is added to give a clear solution after which the furfural is added slowly over a period of about 40 minutes during which time the temperature of the reacting mixture remains at about room temperature. The reacting mixture is agitated for about 1–2 hours after all of the furfural is added and then acidified by the addition of 10% sulphuric acid. The oil material which separates is decanted and distilled under reduced presure yielding about 83% of the theoretical amount of the product. The product is a light yellow liquid which boils at about 94° C. at around 1 mm. of mercury absolute pressure, and it has the following analysis:

|  | Percent C | Percent H |
|---|---|---|
| Calcd. for $C_{11}H_{14}O_2$ | 74.15 | 7.86 |
| Obtained | 74.09 | 7.39 |
|  | 73.99 | 7.50 |

Preparation of potassium 1-alpha-furyl-3-keto-5-methylhexane sulphonate

| | Parts |
|---|---|
| Furfurylidene methyl isobutyl ketone | 31 |
| Potassium metabisulphite | 20 |
| Water | 75 |

A mixture of these substances is heated in a recation vesel provided with a steam jacket and a mechanical agitator for about 2 hours. A clear solution is obtained after about 1 hour. When the reaction is complete about 80 parts of alcohol are added to the solution, thereby precipitating a fine crystalline solid having needle-like crystals. The crystals are filtered and washed with alcohol. The filtrate is poured into a large volume of alcohol, whereby precipitating an additional quantity of crystals. These crystals are filtered, washed with alcohol and combined with the first crop and dried. A yield of about 58% of theoretical amount of the product which does not melt at temperatures up to 250° C. is obtained. A sample which has been crystallized twice from alcohol has the following analysis:

|  | Percent C | Percent H | Percent S |
|---|---|---|---|
| Calcd. for $C_{11}H_{15}O_4SK$ | 44.29 | 5.03 | 10.73 |
| Obtained | 43.74 | 4.65 | 10.82 |
|  | 43.78 | 4.79 | 10.92 |

EXAMPLE 4

Preparation of potassium 1-alpha-furyl-2-nitroethane sulphonate

| | Parts |
|---|---|
| Furfurylidene nitromethane | 42 |
| Ethanol | 80 |
| Potassium metabisulphite (0.15 mol) | 33 |
| Water | 100 |

A solution of the furfurylidene nitromethane in the alcohol is heated in a vessel provided with a steam jacket and a mechanical agitator. During the heating a solution of the potassium metabisulphite in the water is added slowly over a period of about 25 minutes. The reacting mixture is heated for an additional 1–2 hours. The resulting solution is poured into about 4 times its volume of acetone, thereby precipitating a brown solid material which is filtered.

EXAMPLE 5

Preparation of ethyl 3-potassiumsulpho-3-alpha-furylpropionate

| | Parts |
|---|---|
| Ethyl furylacrylate (1 mol) | 147 |
| Potassium metabisulphite (0.5 mol) | 111 |
| Water | 200 |
| Ethylene glycol monoethyl ether | 186 |

These substances are mixed together in a reaction vessel provided with an agitator and a reflux condenser. The reacting mixture is refluxed for about 2 hours at the end of which time a small amount of solid material is present. The mixture is poured into about 1½ times its volume of acetone, thereby precipitating a fine white solid. This solid material is filtered and washed with acetone. The filtrate and washings are evaporated to dryness leaving an orange-colored residue which is suspended in acetone, filtered and washed with acetone. The white solid which remains on the filter is combined with the white solid obtained previously and dried. A yield of about 57% of the theoretical is obtained although analysis indicates that the product contains a small proportion of unreacted potassium metabisulphite.

EXAMPLE 6

Preparation of sodium 3-sodiumsulpho-3-alpha-furylpropionate

| | Parts |
|---|---|
| 3-alpha-furylacrylic acid (1.5 mols) | 207 |
| Sodium sulphite (1.5 mols) | 189 |
| Water | 500 |

These substances are placed in a reaction vessel provided with a reflux condenser and a mechanical agitator. The reacting mixture is refluxed for about 3 hours. The resulting solution is concentrated by partially evaporating the solvent after which it is cooled, thereby precipitating a solid material which is filtered. This procedure of concentrating, precipitating and filtering the solid material is repeated several times until, finally, all of the solvent has been evaporated. The solid material thus obtained is dried at about 110° C. providing a yield of about 93% of the theoretical amount. The product does not melt at temperatures up to about 250° C.

EXAMPLE 7

*Preparation of 2-potassiumsulpho-2-alpha-furylpropionaldehyde*

| | Parts |
|---|---|
| Impure 2-alpha-furylacrolein | 80 |
| Potassium metabisulphite | 69 |
| Water | 100 |

The 2-alpha-furylacrolein contains a small proportion of impurities. A mixture of the substances tabulated is heated in a suitable reaction vessel surrounded by a steam bath and provided with an agitator. The reacting mixture is heated for about 5 hours and an additional 25 parts of potassium metabisulphite is added. The heating is continued for about 1 hour or more. A small amount of oily material which separates is decanted. The reaction mixture is cooled and a solid mass forms. The solid mass is broken up, filtered, washed with alcohol and dried. A yield of about 183 parts of product is obtained.

EXAMPLE 8

*Preparation of 2-cyano-3-potassiumsulpho-3-alpha-furylpropionamide*

| | Parts |
|---|---|
| Furfurylidene cyanacetamide (1 mol) | 162 |
| Potassium metabisulphite (0.5 mol) | 111 |
| Water | 100 |

A mixture of these substances is heated until a clear solution is obtained. The solution is refluxed for about 2 hours and then evaporated, leaving a light yellow solid as a residue. About 155 parts of a slightly hydrated product is obtained.

In order to obtain the sulphonates contemplated by my invention it is apparent from the foregoing examples that 1 mol of furfural reacts with 1 mol of a substance containing an active methyl group or an active methylene group and the resuling compound in turn reacts with 1 mol of a bisulphite or sulphurous acid. It may be desirable, of course, in some instances to employ an excess of one of the reactants in order to drive the reaction to completion.

EXAMPLE 9

*Preparation of potassium 1-alpha-furyl-3-keto-butane sulphonate*

| | Parts |
|---|---|
| Furfurylidene acetone | 136 |
| Potassium metabisulphite | 113 |
| Water | 150 |

These substances are placed in a reaction vessel provided with a mechanical agitator and a reflux condenser and the mixture is heated to boiling. A homogeneous solution is obtained in about 20 minutes and it is refluxed for about 6 hours. The solvent is distilled under reduced pressure (e. g., 25 mm. of mercury absolute pressure) leaving as a residue a white solid which is washed with ethanol and filtered. The solid is suspended in boiling ethanol and water is aded slowly until the former is completely dissolved. Decolorizing charcoal is added to the hot solution, which is filtered and the colored filtrate permitted to cool during which time a white crystalline solid deposits. This white crystalline material is filtered, washed with ethanol and dried. A yield of about 62% of the theoretical yield is obtained. The melting point of the product is about 212–213° C. and a recrystallized sample gives the following analysis:

| | Percent C | Percent H | Percent S |
|---|---|---|---|
| Calcd. for $C_8H_9O_5SK$ | 37.49 | 3.51 | 12.50 |
| Obtained | 37.25 | 3.59 | 12.75 |
| | 37.85 | 3.85 | 12.61 |

Other substances having an active methyl group or an active methylene group may be reacted with furfural and converted to the sulphonate in accordance with the foregoing disclosure. Thus, for example, other ketones may be used (e. g., methyl hexyl ketone, di-n-butyl ketone, methyl-n-propyl ketone, methyl-n-butyl ketone, etc.), chloracetic acid, crotonic acid, sorbic acid, propionic acid, butyric acid, succinic acid, malonic acid, lauric acid, phenylacetic acid, oxalacetic acid, 3,5-dinitro-o-toluic acid, and their esters (such as the methyl, ethyl, benzyl and phenyl esters) and their amides, croton-aldehyde, sorbic aldehyde, propionaldehyde, heptaldehyde, succinic aldehyde, phenylacetaldehyde, acetonitrile, propionitrile, lauronitrile, crotonic nitrile, succinonitrile, phenylacetonitrile, nitroethane, 1-nitropropane, 1-nitrobutane, 1-nitropropylene, 1-nitro-octylene-2, etc.

Compounds having the general formula:

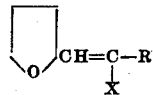

may be converted to the corresponding sulphonate by treatment with a bisulphite or with sulphur dioxide in a suitable medium such as water. Suitable bisulphites include sodium bisulphite, potassium bisulphite, ammonium bisulphite or any other desirable sulphite such as calcium bisulphite. In general the alkali metal bisulphites are preferred. The hydrogen sulphonates may be converted into the corresponding metal, ammonium or amine salts if desired. Examples of amines for such salts are: methyl amine, dimethyl amine, pyridine, triethyl amine, the mono-, di- and tri-ethanolamines, etc. Another method of producing the sulphonates is by treatment of the furfurylidene compounds with a hydrogen halide followed by treatment with sodium sulphite or with the alkali metal sulphites. Thus, for example, hydrogen chloride may be added to furfurylidene acetone and the resulting material treated with sodium sulphite. Still another type of sulphonate may be prepared by the condensation of furfural with a halogen substituted ketone such as chloracetone, followed by treatment (1) with a hydrogen halide and then with a sulphite or (2) with an equimolecular mixture of a bisulphite and a sulphite. The bisulphite or sulphite may be a salt of an alkali metal, ammonia, or any other desired metal or amine.

The sulphonates may be prepared from the furfurylidene compounds by reaction with the bisulphite at temperatures ranging upwards from room temperature. In most instances, the reaction is advantageously carried out at a temperature between about 70° C. and about 130° C. If sulphur dioxide be used, the reaction is preferably carried out under pressure, e. g., 25–100 pounds per sq. in., and/or at relatively low temperatures such as about 20° C. The time or reaction varies somewhat according to the compatibility of the reactants. Thus, if a homogeneous solution of the reactants be employed, the reaction will usually be completed in from about ½ hour to about 2 hours. On the other hand, if the solution of the reactants is not homogenous, 6–8 hours or even more may be required. Generally, water is employed as the solvent medium for the bisulphite and the furfurylidene compound but if sufficient solubility is not obtained other solvents may be used. Mixtures of water and water-miscible organic solvents are especially suitable since the water is a good solvent for the bisulphite, while the organic solvent is a good solvent for the furfurylidene compound. Examples of suitable solvents are methanol, ethanol, propanol, isopropanol, tertiary butanol, dioxane, the lower alkyl monoethers of ethylene glycol and diethylene glycol, such as the mono-ethyl ether of ethylene glycol, the mono-butyl ether of diethylene glycol, etc. Furthermore, inert ketones may be employed as solvents for the reactants in the production of the sulphonates. In some instances it may be desirable to employ active ketones as intermediates in the preparation of the sulphonates. Thus, the bisulphite may add to an active ketone and this in turn reacts with the furfurylidene compound, the former giving up the bisulphite to the latter.

My furyl substituted sulphonic acids are especially suitable for resinification with an aldehyde to produce resinous materials having cation active properties. They are also useful in the preparation of emulsifiers, wetting agents, dispersing agents and as intermediates in the synthesis of many other organic compounds.

Obviously many modifications and variations in the processes and compositions described above may be made without departing from the spirit and scope of the invention as defined in the appended claims.

I claim:

1. A mono-1-alpha-furyl-substituted aliphatic monosulphonate-1.
2. A mono-1-alpha-furylketone sulphonate-1.
3. A 1-alpha-furyl-3-ketobutane sulphonate-1.

JACK T. THURSTON.